(12) United States Patent
Takeda et al.

(10) Patent No.: US 7,839,259 B2
(45) Date of Patent: Nov. 23, 2010

(54) MOUNTING STRUCTURE FOR TEMPERATURE SWITCH

(75) Inventors: Teruyuki Takeda, Nagoya (JP); Masahiro Inagaki, Nagoya (JP)

(73) Assignee: Ubukata Industries Co., Inc. (JP)

( * ) Notice: Subject to any disclaimer, the term of this patent is extended or adjusted under 35 U.S.C. 154(b) by 281 days.

(21) Appl. No.: 11/997,125

(22) PCT Filed: Aug. 2, 2005

(86) PCT No.: PCT/JP2005/014114

§ 371 (c)(1),
(2), (4) Date: Mar. 20, 2008

(87) PCT Pub. No.: WO2007/015293

PCT Pub. Date: Feb. 8, 2007

(65) Prior Publication Data

US 2010/0090793 A1    Apr. 15, 2010

(51) Int. Cl.
*H01H 37/52* (2006.01)
*H01H 37/04* (2006.01)
*H01H 37/06* (2006.01)

(52) U.S. Cl. .................. 337/380; 337/97; 337/112

(58) Field of Classification Search ............. 337/380, 337/398, 327, 112, 121, 34, 97
See application file for complete search history.

(56) References Cited

U.S. PATENT DOCUMENTS

| | | | | |
|---|---|---|---|---|
| 3,131,322 A | * | 4/1964 | Pleiss, Jr. et al. | 337/380 |
| 4,297,668 A | * | 10/1981 | Place | 337/365 |
| 4,467,385 A | * | 8/1984 | Bandoli et al. | 361/24 |
| 5,723,922 A | * | 3/1998 | Fowlkes | 310/68 C |
| 5,870,014 A | * | 2/1999 | Nield et al. | 337/362 |
| 5,903,418 A | * | 5/1999 | Boivin et al. | 361/22 |
| 6,127,913 A | * | 10/2000 | Niino et al. | 337/343 |
| 6,154,117 A | * | 11/2000 | Sato et al. | 337/365 |
| 6,417,758 B1 | * | 7/2002 | Russell et al. | 337/380 |
| 6,760,216 B2 | * | 7/2004 | Seo | 361/601 |
| 6,781,504 B2 | * | 8/2004 | Scott et al. | 337/380 |
| 7,345,571 B2 | * | 3/2008 | Mizuno | 337/381 |

FOREIGN PATENT DOCUMENTS

| | | |
|---|---|---|
| JP | 55-167134 U | 12/1980 |
| JP | 1979-67185 | 12/1980 |
| JP | 57-64728 U | 4/1982 |

(Continued)

*Primary Examiner*—Anatoly Vortman
(74) *Attorney, Agent, or Firm*—Thomas & Karceski, P.C.

(57) ABSTRACT

A structure for mounting a temperature switch on a compressor of a vehicle air-conditioner is disclosed. The switch has a cylindrical metal container and a thermally responsive element disposed on a container bottom. The structure includes a housing recess for housing the switch, a fixing cover including an upper cover and one or plural band-shaped legs downwardly extending from a peripheral edge of the cover and housed in the recess with the switch, and one or plural claws formed on the fixing cover legs. When the switch is housed in the recess, the claws are engaged with an inner surface of the recess to be locked. An adhesive is interposed between the switch and the recess when the switch is housed in the recess. The legs are constructed so that parts of the legs are buried in the adhesive when the switch is housed in the recess.

5 Claims, 11 Drawing Sheets

FOREIGN PATENT DOCUMENTS

| | | |
|---|---|---|
| JP | 1980-141635 | 4/1982 |
| JP | 63-58442 U | 4/1988 |
| JP | 1986-152098 | 4/1988 |
| JP | 03-37009 U | 4/1991 |
| JP | 1989-98945 | 4/1991 |
| JP | 03-48735 U | 5/1991 |
| JP | 1989-110161 | 5/1991 |
| JP | 05-101761 A | 4/1993 |
| JP | 07-226137 A | 8/1995 |
| JP | 2007-226137 | 8/1995 |
| JP | 2002-367495 A | 12/2002 |

* cited by examiner

US 7,839,259 B2

MOUNTING STRUCTURE FOR TEMPERATURE SWITCH

CROSS-REFERENCE TO RELATED APPLICATIONS

This application is a National Phase Application based upon and claiming the benefit of priority to PCT/JP2005/014114, filed on Aug. 2, 2005, the contents of which are incorporated herein by reference.

TECHNICAL FIELD

The present invention relates to a mounting structure for a temperature switch used for a compressor of a vehicle air conditioner.

BACKGROUND ART

Compressors of some types of vehicle air conditioners are provided with a temperature switch detecting an overheated state. The temperature switch is composed of a cylindrical container made of a metal and a disc-shaped thermally actuated element disposed on a bottom of the container. Japanese Patent No. 2873357 discloses one of such temperature switches, for example.

The aforesaid temperature switch is adapted to be inserted into a mounting hole formed in a compressor housing. The mounting hole is previously filled with a silicone adhesive having a high thermal conductivity and accordingly, the silicone adhesive is interposed between the mounting hole and the temperature switch pushed into the mounting hole. Heat of the housing is thus transferred to the temperature switch efficiently.

The aforesaid temperature switch is fixed in the mounting hole with sufficient strength when the adhesive has been hardened, although there is a possibility that the temperature switch may be displaced or float thereby to fall off until the adhesive is hardened. In order that the temperature switch may be prevented from falling off the mounting hole until the adhesive is hardened, an elastic member such as a leaf spring is conventionally screwed to the compressor housing so that the temperature switch is pressed against the mounting hole by the elastic member.

However, the above-described method increases the number of components and results in troubles in screwing the leaf spring to the housing, posing a problem of low workability.

SUMMARY

An object of the present invention is to provide a temperature switch mounting structure which can realize easy and firm mounting of the temperature switch on the compressors for vehicle air-conditioners.

In one aspect, there is provided a structure for mounting a temperature switch on a compressor of a vehicle air-conditioner, the temperature switch having a bottomed cylindrical container made of metal and a circular shallow dish-shaped thermally responsive element disposed on a bottom of the metal container, comprising a housing recess provided on a surface of a housing of the compressor for housing the temperature switch; a fixing cover including an upper cover covering an upper surface of the temperature switch and one or a plurality of band-shaped legs downwardly extending from a peripheral edge of the upper cover along a side of the temperature switch, the fixing cover being housed in the housing recess together with the temperature switch while covering the temperature switch from above; and one or a plurality of claws provided on the band-shaped legs of the fixing cover, wherein when the temperature switch is housed in the housing recess, the claws are engaged with an inner surface of the housing recess to be locked, whereby the temperature switch is fixed in the housing recess; wherein an adhesive having thermal conductivity is housed in the housing recess, the adhesive being interposed between lower part of the temperature switch and the housing recess when the temperature switch is housed in the housing recess; and wherein the band-shaped legs are constructed so that parts of the band-shaped legs are buried in the adhesive when the temperature switch is housed in the housing recess.

DETAILED DESCRIPTION

Embodiments will be described in detail with reference to the accompanying drawings.

Figure 1:
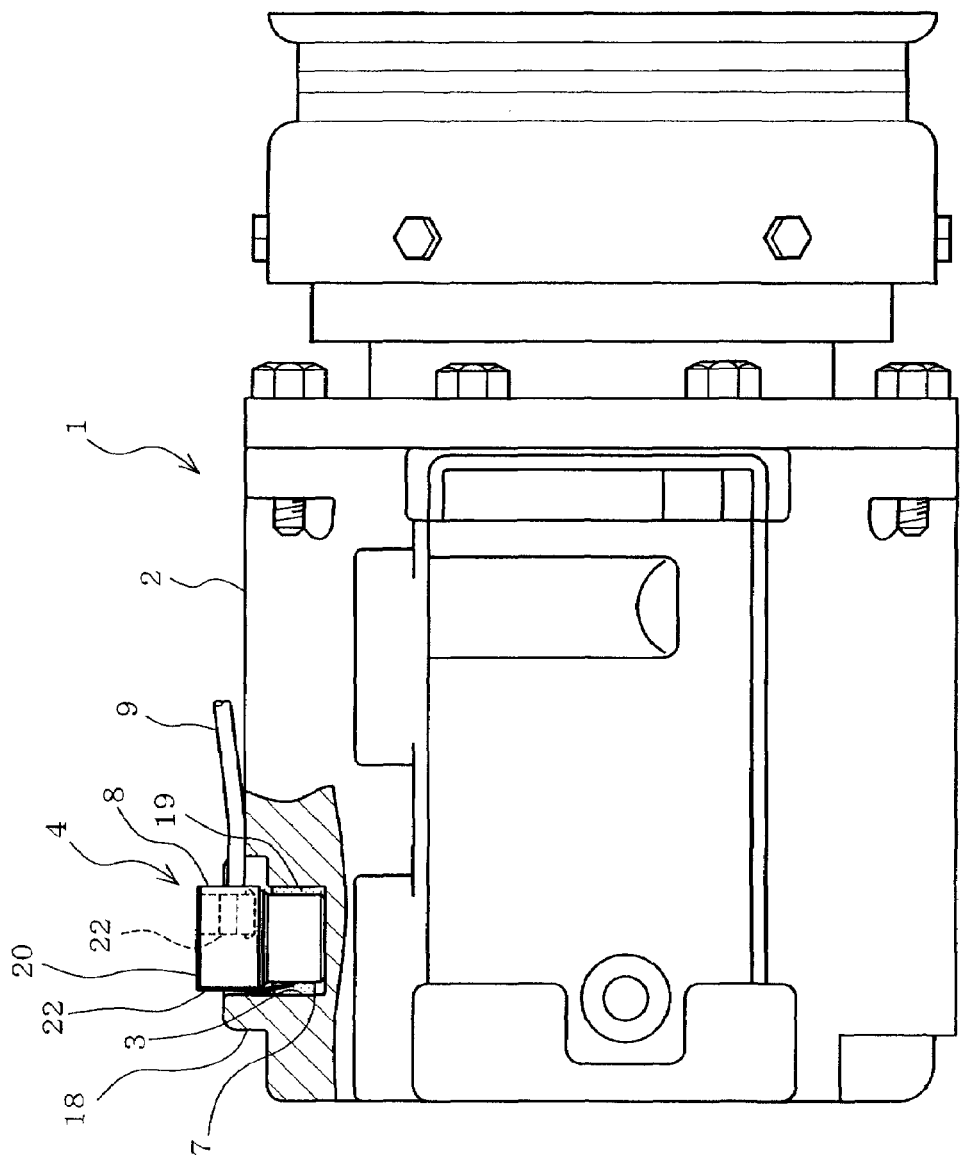
FIG. 1 is a front view of a compressor with a housing recess for a temperature switch being broken in a first embodiment of the present invention.

FIGS. 1 to 9 show a first embodiment FIG. 1 shows an overall construction of a refrigerant compressor 1 of a vehicle air conditioner relevant to the embodiment. The compressor 1 includes a housing 2 further including an upper part. A mounting hole 3 is provided in a portion of the upper part corresponding to a high pressure side refrigerant path (not shown). A temperature switch 4 for detecting an overheated state of refrigerant is mounted in the mounting hole 3.

As shown in FIGS. 5 and 7 to 9, the temperature switch 4 includes a switch body 7 comprised of a bottomed cylindrical metal container in which a thermally actuated element 5, a contact mechanism and the like are enclosed, a resin cap 8 made of a resin and covering an upper opening of the switch body 7 and lead wires 9 drawn out through the cap 8.

The thermally actuated element 5 is made by punching out a material such as bimetal to obtain a circular disc and drawing the disc into a shallow dish shape. The thermally actuated element 5 is disposed on a bottom of the switch body 7. A retainer plate 10 made of a spring material such as beryllium copper, stainless steel or the like is disposed on the thermally actuated element 5. A pressure receiver 11 is mounted substantially on a central part of the retainer plate 10.

A metal plate 12 having two through holes 12a are mounted on an upper part of the switch body 7 by welding or the like. The cap 8 is mounted to the metal plate 12. Electrically conductive pins 13 are inserted through the respective through holes 12a with an electrically insulating material 14 such as glass being interposed therebetween. The insulating material 14 hermetically closes a gap between the through holes 12 and the conductive pins 13 respectively, and the conductive pins 13 and the metal plate 12 are electrically insulated from each other.

A fixed contact member 15 and a movable contact member 16 both constituting a contact mechanism are connected to upper ends of the conductive pins located in the switch body 7 respectively. The fixed contact member 15 has a fixed contact 15a, whereas the movable contact member 16 has a movable contact 16a which makes and breaks off contact with the fixed contact member 15a. The movable contact member 16 is mounted to the pressure receiver 11.

On the other hand, the lead wires 9 are connected to upper ends of the conductive pins 13 located outside the switch body 7 respectively. The cap 8 is formed into an approximately semicircular shape, and an underside and a part of side of the cap 8 are open. The other ends of the lead wires 9 are drawn out through openings of a side of the resin cover to be connected to a control circuit and a power supply (not shown) for the compressor. An interior of the cap 8 is filled with a filler 17 with electrical insulation properties, so that connections between the conductive pins 13 and the lead wires 9 are hermetically fixed.

Figure 8:
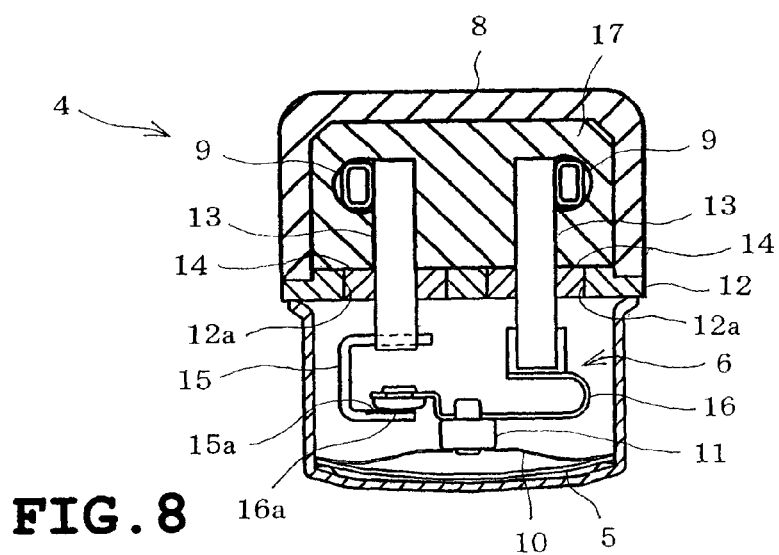
FIG. 8 is a longitudinally sectional front view of the temperature switch in the case where a contact mechanism is closed.
Figure 9:
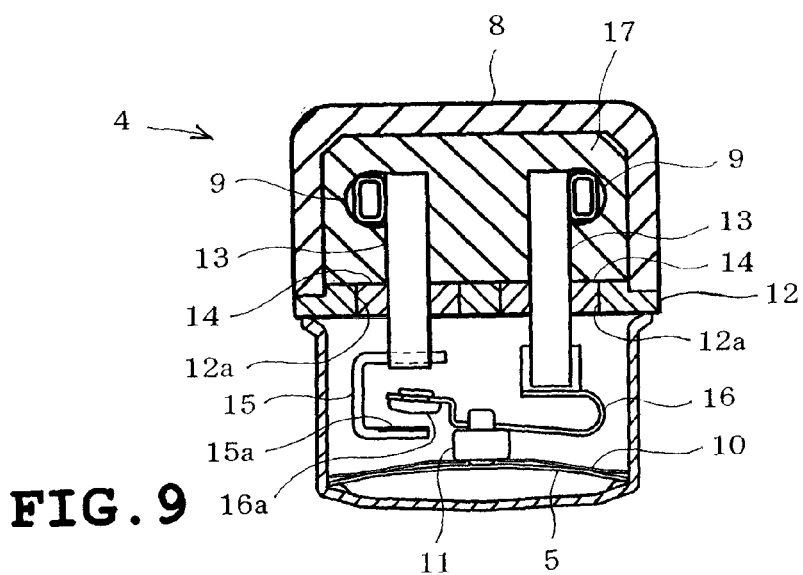
FIG. 9 is a longitudinally sectional front view of the temperature switch in the case where a contact mechanism is open.

When at a normal temperature, the thermally actuated element 5 is downwardly convex as shown in FIG. 8 such that the thermally actuated element 5 is in abutment with the bottom of the switch body 7 by an elastic force of the retainer plate 10. In this case, the fixed and movable contacts 15a and 16a are in contact with each other. On the other hand, when the temperature rises up to a predetermined temperature, the thermally actuated element 5 reverses its curvature into an upwardly convex state as shown in FIG. 9, thereby pressing up the pressure receiver 11. As a result, the movable contact member 16 is pressed up such that the movable contact 16a departs from the fixed contact 15a.

Figure 2:
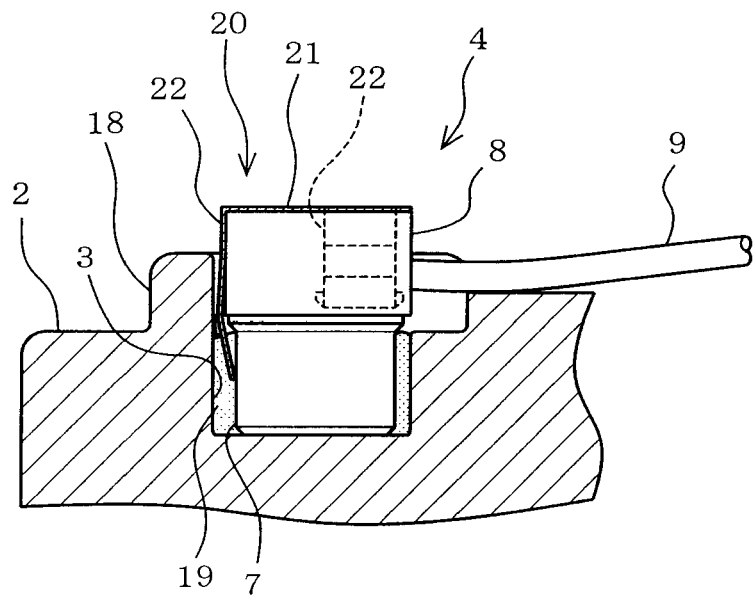
FIG. 2 is an enlarged longitudinal section of a temperature switch mounting portion of the compressor.
Figure 3:
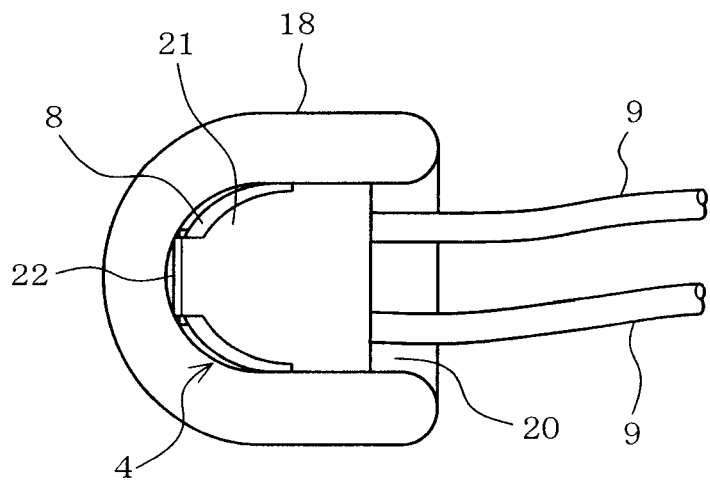
FIG. 3 is an enlarged plan view of the temperature switch mounting portion of the compressor.

The mounting hole 3 has a depth that is set so that substantially an entire switch body 7 is inserted into the mounting hole 3, as shown in FIGS. 2 and 3. The mounting hole 3 has a bottom to which the bottom of the switch body 7 housed in the mounting hole 3 tightly adheres. A U-shaped extended wall 18 is provided on a part of an outer surface of the housing 2 located along a periphery of the mounting hole 3. The extended wall 18 is formed into a shape corresponding to a side configuration of the cap 8, so that the extended wall is located along a lower half side of the cap 8 when the temperature switch 4 has been attached into the mounting hole 3. More specifically, the temperature switch 4 is constructed so that an upper half of the cap 8 protrudes over the extended wall 18. The mounting hole 3 and the extended wall 18 constitute a housing recess in the embodiment.

A space between the mounting hole 3 and the temperature switch 4 is filled with a silicone adhesive with a good thermal conductivity. A suitable amount of the adhesive 19 is previously housed in the mounting hole 3. The temperature switch 4 is pushed into the mounting hole 3 so that the bottom thereof adheres substantially closely to the bottom of the mounting hole 3. As a result, the adhesive 19 is interposed in a part of or an entire space between the temperature switch 4 and the mounting hole 3. The thermal conductivity of the housing 2 to the switch body 7 is improved by the adhesive 19, whereby the responsiveness of the temperature switch 4 can be improved. Furthermore, when the adhesive 19 is hardened, the temperature switch 4 is fixed so as to be prevented from falling off the mounting hole 3 by a tensile force applied thereto during normal handling.

Figure 4:
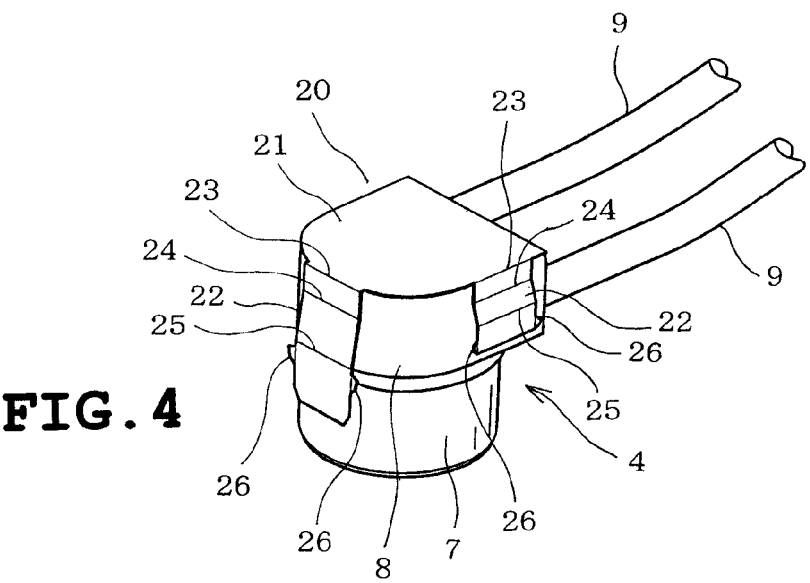
FIG. 4 is a perspective view of the temperature switch with a fixing cover being attached thereto.
Figure 5:
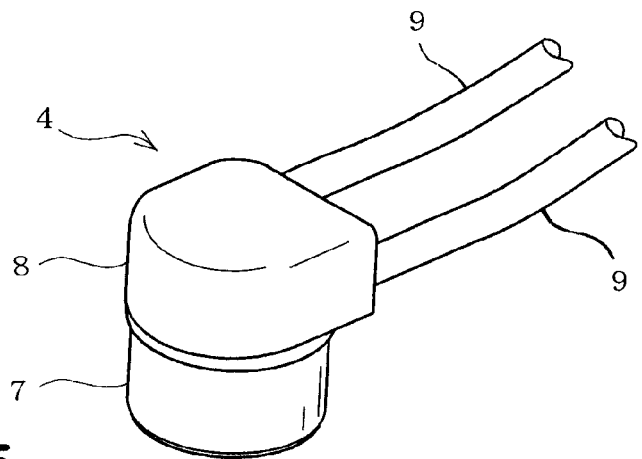
FIG. 5 is a perspective view of the temperature switch.
Figure 6:
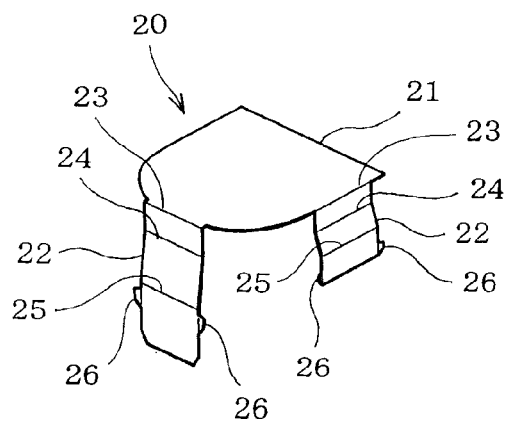
FIG. 6 is a perspective view of the fixing cover.
Figure 7:
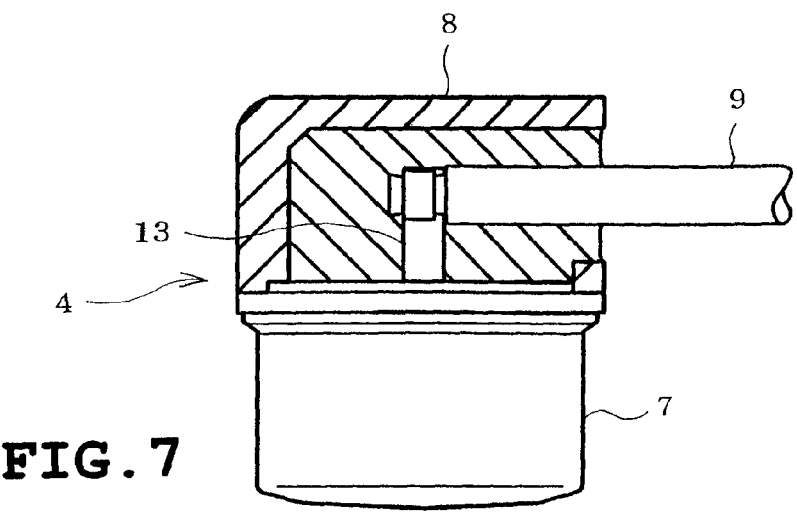
FIG. 7 is a side elevation of the temperature switch with a resin cover being shown in section.

On the other hand, as shown in FIGS. 4 and 6, the temperature switch 4 attached to the mounting hole 3 is covered by a fixing cover 20. The fixing cover 20 has an upper cover 21 having substantially the same shape as a shape of the top of the cap 80 and three band-shaped legs 22 each extending from a peripheral edge of the upper cover 21 along the side of the temperature switch 4. The fixing cover 20 comprises a leaf spring formed by bending a base material (not shown) obtained by stamping out a metal plate. The legs 22 are adapted to be buried in the adhesive when the temperature switch 4 covered by the fixing cap 20 is inserted into the mounting hole 3.

The three legs 22 include two shorter legs having respective lower ends located slightly over the lower end of the cap 8 and one longer leg located slightly below the lower end of the cap 8. The shorter legs are provided on linear portions of both ends of a substantially arc-shaped peripheral edge of the upper cover 21 and opposed to each other. The longer leg is provided near the center of the arc-shaped peripheral edge of the upper cover 21.

In addition to a bending portion (hereinafter, "first bending portion 23), each leg 22 is bent at upper and lower bending portions (hereinafter, "second and third bending portions 24 and 25). More specifically, each leg 23 is bent at the first bending portion 23 so as to be at about 90 degrees to the upper cover 21, at the second bending portion 24 so as to be spread slightly outward, and at the third bending portion 25 so as to be narrowed slightly inward. When the fixing cover 20 has been put onto the temperature switch 4, the third bending portion 25 of the longer leg 22 is located slightly over the lower end of the cap 8, and the lower end of the longer leg 22 is adapted to abut against the side of the switch body 7. Furthermore, the lower ends of the shorter legs 22 are adapted to abut against the side of the cap 8.

Three pairs of claws are provided with both side lower ends of each shorter legs and both sides of the longer leg located beneath the third bending portion 25 respectively. Each claw 26 comprises a pair of pointed protrusions formed integrally with each leg 22. Each claw 26 protrudes outward so as to come into contact with an inner surface near a boundary between the mounting hole 3 and the extended wall 18 when the fixing cover 20 has been inserted into the mounting hole 3 together with the temperature switch 4.

The temperature switch 4 is attached to the mounting hole 3 when pushed into the mounting hole 3 while being covered with the fixing cover 4 from above. In this case, since the lower ends of the legs 22 of the fixing cover 20 are in abutment with the side of the temperature switch 4, it is difficult to detach the fixing cover 20 from the temperature switch 4. Furthermore, the legs 4 can easily be inserted into slight gaps between the temperature switch 4 and the mounting hole 3 and extended wall 18.

The claws 26 are brought into contact with the inner surfaces of the mounting hole 3 and the extended wall 18 when the temperature switch 4 and the fixing cover 20 are inserted into the mounting hole 3. Particularly, the longer leg 22 is provided beneath the bending portion 25 and inclined outward from the second bending portion 24 toward the third bending portion. Accordingly, when the claws 26 abut against the inner surfaces of the mounting hole 3 and the extended wall 18, the legs 22 are pushed to the temperature switch 4 side. Furthermore, the longer leg 22 is inserted into the space between the temperature switch 4 and parts that of the inner surfaces of the mounting hole 3 and the extended wall 18 and are curved to a large extent. Accordingly, the longer leg 22 is flexed along the curvature. As a result, the claw 26 of the longer leg 22 is particularly intensively pressed against the inner surface of the extended wall 18 by an elastic force of the leg 22 pushed to the temperature switch 4 side.

Furthermore, all the claws 26 (the fixing cover 20) are made of a metal harder than a housing 2. Accordingly, the claws 26 bite into inner surfaces of the mounting hole 3 and the extended wall 18 when causing to abut against or pressed against the inner surfaces of the mounting hole 3 and the extended wall 18. Furthermore, when a frictional force reacts between the mounting hole 3, extended wall 18 and claws 26, the claws 26 are locked by the mounting hole 3 and the extended wall 18. Consequently, the temperature switch 4 inserted into the mounting hole 3 can be prevented from falling off the mounting hole 3.

Still furthermore, the part of the longer leg 22 located below the claws 26 is buried in the adhesive 19 interposed between the temperature switch 4 and the mounting hole 3. Accordingly, the temperature switch 4 and fixing cover 20 both inserted into the mounting hole 3 are fixed to the mounting hole 3 with a sufficient strength obtained from hardening of the adhesive 19.

According to the foregoing embodiment, when the temperature switch 4 to which the fixing cover 20 has been attached is pushed into the mounting hole 3, the temperature switch 4 can be mounted in the mounting hole 3. In particular, the fixing cover 20 and the temperature switch 4 are simultaneously pushed into the mounting hole 3, the mounting efficiency in the mounting of the temperature switch 4 can be improved and a working time of the mounting work can be shortened.

Furthermore, since no special members are necessitated for the purpose of mounting the fixing cover 20 to the temperature switch 4, the number of components can be reduced as compared with the conventional temperature switches.

Furthermore, each leg 22 is formed into the band shape, and the claws 26 are provided on the widthwise opposed portions of the legs 22. Accordingly, the legs 22 having been inserted in the mounting hole 3 are flexed circumferentially along the inner surface. Consequently, since the claws 26 are pressed against the inner surfaces of the mounting hole 3 and extended wall 18 by a force returning the flexed legs 22 to the former states, the claws 26 can be locked onto the mounting hole 3 and the extended wall 18 more strongly.

Figure 10:
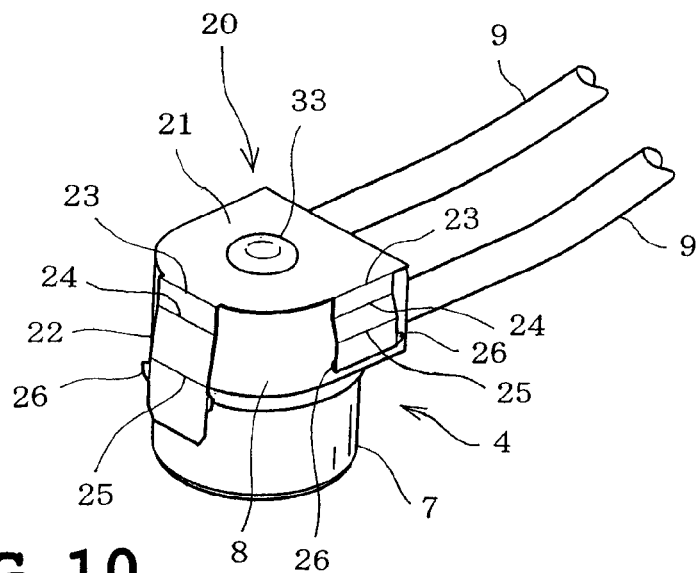
FIG. 10 is a view similar to FIG. 4, showing a second embodiment of the invention.
Figure 11:
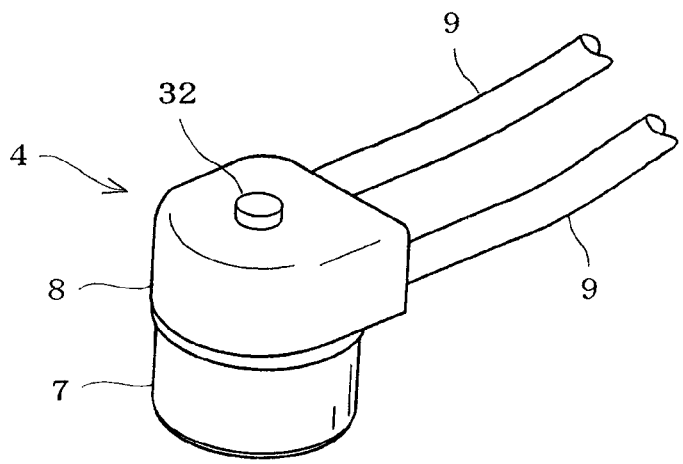
FIG. 11 is a view similar to FIG. 5.
Figure 12:
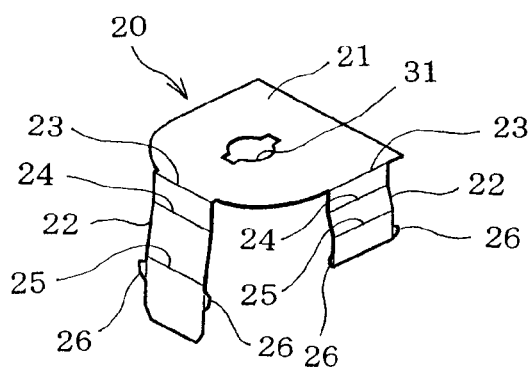
FIG. 12 is a view similar to FIG. 6.

FIGS. 10 to 12 illustrate a second embodiment. Only the differences of the second embodiment from the first embodiment will he described. Identical or similar parts in the second embodiment are labeled by the same reference symbols as those in the first embodiment. In the second embodiment, the fixing cover 20 is fixed to the cap 8 of the temperature switch 4 by thermal caulking. More specifically, a hole 31 is formed in a central part of the upper cover 21 of the fixing cover 20. A convex portion 32 is formed on the upper surface of the cap 8 of the temperature switch 4 so as to correspond to the hole 31. After the fixing cover 20 has been put onto the temperature switch 4 so that the convex portion 32 is inserted into the hole 31, heat is applied to the convex portion 32 to deform the convex portion 32, whereby the fixing cover 20 is fixed to the cap 8. Reference symbol 33 in FIG. 10 designates the thermally deformed convex portion.

According to the foregoing construction, the fixing cover is mounted integrally on the temperature switch 4. Consequently, the fixing cover 20 can be prevented from falling off the temperature switch 4 when the temperature switch 4 is inserted into the mounting hole 3, whereupon the working efficiency can be improved.

Figure 13:
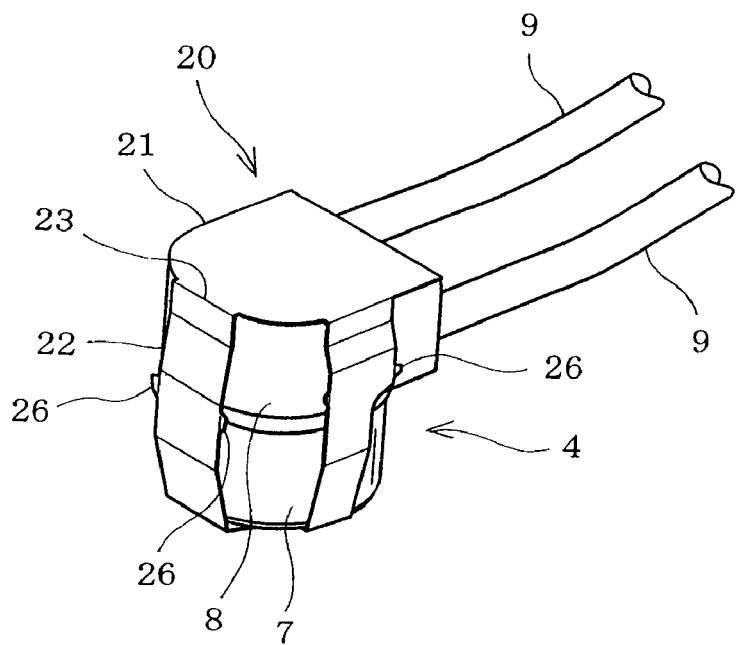
FIG. 13 is a view similar to FIG. 4, showing a third embodiment of the invention.
Figure 14:
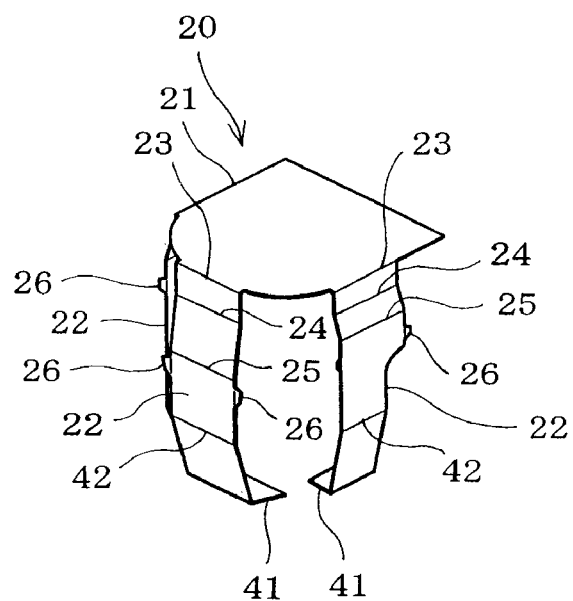
FIG. 14 is a view similar to FIG. 6.

FIGS. 13 and 14 illustrate a third embodiment. Only the differences of the third embodiment from the first embodiment will be described. In the present embodiment, the three legs of the fixing cover 20 extend to the lower end of the temperature switch 4, and locking pieces 41 (serving as a locking portion) locked on the underside of the switch body 7 are provided integrally on the lower ends of the legs 22 respectively. Furthermore, each leg 22 has a fourth bending portion 42 in addition to the first and third bending portions 23 to 25. The fourth bending portion 42 is adapted to be located near the vertically central portion of the side of the switch body 7. Each leg 22 is bent at the fourth bending portion 42 so as to be narrowed inward.

According to the above-described construction, the fixing cover 20 is attached to the temperature switch 4 so as to wrap the temperature switch 4 around. Accordingly, the fixing cover 20 can be prevented from falling off the temperature switch 4 as much as possible. Furthermore, since each leg 22 is bent at the third and fourth bending portions 25 and 42 so as to be narrowed inward, the fixing cover 20 can easily be inserted into the mounting hole 3 together with the temperature switch 4. Furthermore, the locking pieces 41 are held between the bottoms of switch body 7 and the mounting hole 3. Moreover, since the lower portions of all the legs 22 are buried in the adhesive 19, the temperature switch 4 can reliably be prevented from falling off the mounting hole 3.

Figure 15:
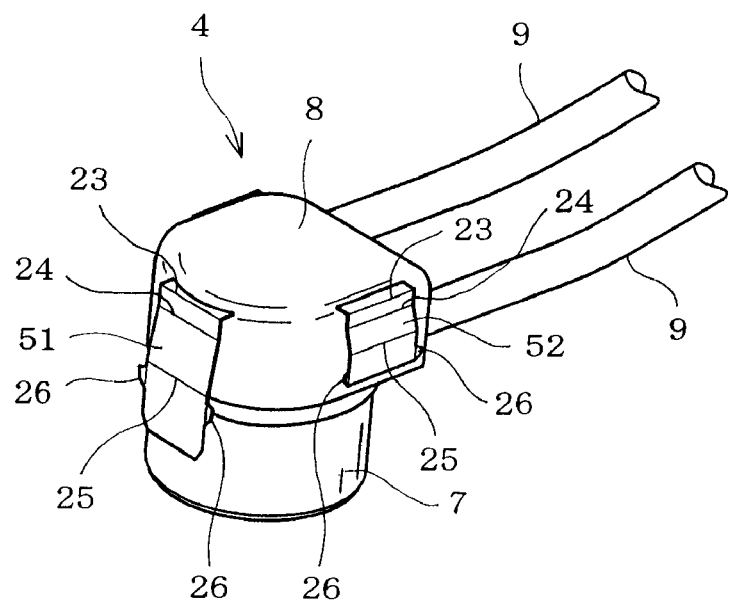
FIG. 15 is a view similar to FIG. 5, showing a fourth embodiment of the invention.

FIG. 15 illustrates a fourth embodiment of the present invention. Only the differences of the fourth embodiment from the first embodiment will be described. In the fourth embodiment, one longer leg piece 51 and two shorter leg pieces 52 (serving as a band-shaped member) are provided integrally on the cap 8 of the temperature switch 4. The leg piece 51 corresponds to the longer leg 22 of the fixing cover 20 in the first embodiment and has the first to third bending portions 23 to 25 and the claws 26 formed on respective corresponding portions. Furthermore, the leg pieces 52 correspond to the above-described shorter legs 22 and has the first to third bending portions 23 to 25 and claws 26 formed on respective corresponding portions.

Such a construction can achieve the same operation and effects which are the same as those in the first embodiment. Furthermore, since the temperature switch 4 and the leg pieces 51 and 52 are integrated, the temperature switch can be handled more easily as compared with the case where the legs are provided on the fixing cover which is a discrete member from the temperature switch 4.

Figure 16:
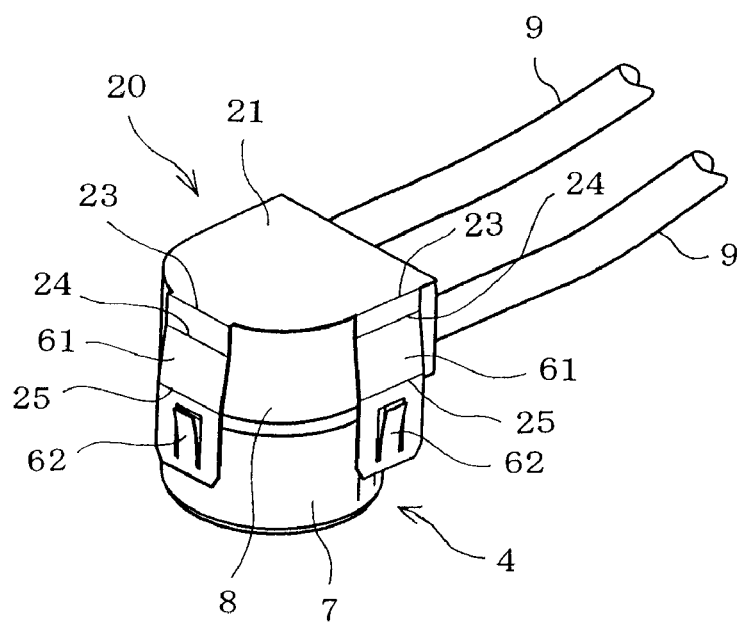
FIG. 16 is a view similar to FIG. 4, showing a fifth embodiment of the invention.
Figure 17:
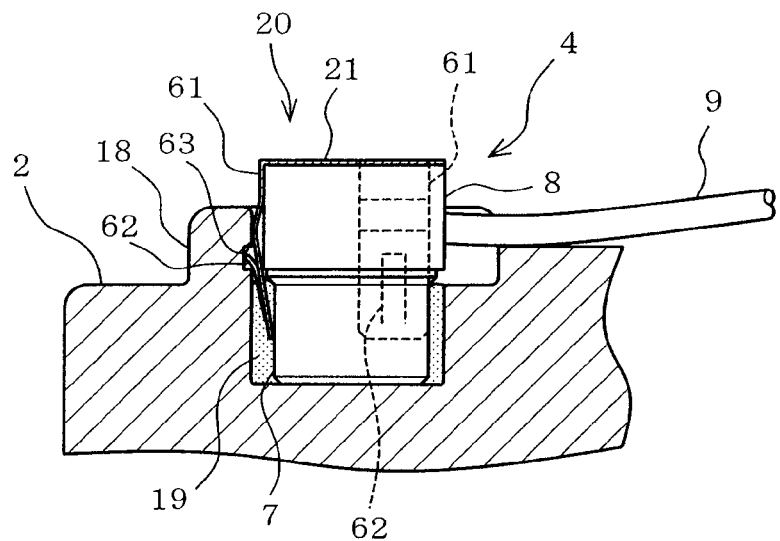
FIG. 17 is a view similar to FIG. 2.

FIGS. 16 and 17 illustrate a fifth embodiment of the invention. Only the differences of the fifth embodiment from the first embodiment will be described. Identical or similar parts in the fifth embodiment are labeled by the same reference symbols as those in the first embodiment. The fixing cover 20 in accordance with the fifth embodiment has three band-shaped legs 61, instead of the foregoing legs 22. The three legs 61 are provided at three locations on the peripheral edge of the upper cover 21 in the same manner as in the legs 22 in the first embodiment. Furthermore, each leg 61 has a length that is approximately the same as that of each longer leg and is provided with the first to third bending portions substantially at the same locations as those in the first embodiment.

A U-shaped notch is formed between the third bending portion 25 and the lower end of each leg 61. A tongue surrounded by the notch is raised up slightly outward thereby to be formed into each claw 62. Each claw 62 is connected at a lower end thereof to the leg 61. Furthermore, each claw 62 has an upper end which is constructed so as to be located near the lower end of the cap 8 when the fixing cover 20 has been attached to the temperature switch 4.

On the other hand, a groove 63 (serving as engagement portion) is formed in the inner surface of the extended wall 18. The groove 63 is provided so as to assume a location where the upper end of the claw 62 is located when the temperature switch 4 has been pushed deep into the mounting hole 3.

In the above-described construction, when the temperature switch 4 to which the fixing cover 20 has been attached is pushed into the mounting hole 3, the legs 61 are inserted into the mounting hole 3 together with the temperature switch 4 while being pushed in such a direction that the legs 61 escape from the inner surface of the mounting hole 3. When the temperature switch 4 has been inserted deep into the mounting hole 3, the distal ends of the claws 62 enter the groove 63. Furthermore, the lower portions of all the legs 61 are buried in the adhesive 19. In this case, substantially an entire part of each claw 62 is also buried in the adhesive 19. Accordingly, even when a force with a direction in which the temperature switch 4 and fixing cover 20 drop out of the mounting hole 3 is applied to the temperature switch 4 and fixing cover 18, the temperature switch 4 can be prevented from falling off the mounting hole 3 since the distal ends of the claws 62 are locked in the groove 63.

Figure 18:
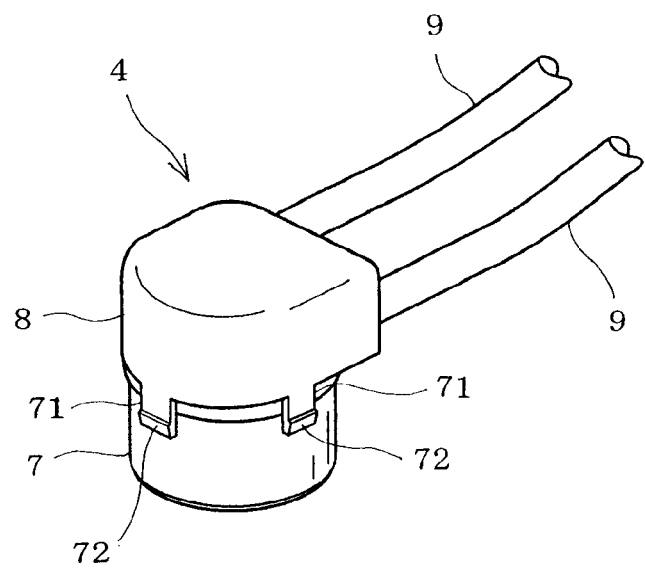
FIG. 18 is a view similar to FIG. 5, showing a sixth embodiment of the invention.

FIG. 18 illustrates a sixth embodiment. Only the differences of the sixth embodiment from the fifth embodiment will be described. In the sixth embodiment, three claws 71 are formed integrally on a lower portion of the cap 8 so as to extend downward. Each claw 71 has a lower end with an outer surface provided with a protrusion 72.

The above-described temperature switch 4 is attached to the mounting hole 3 in the same manner as in the fifth embodiment. More specifically, the groove 63 is formed in the inner surface of the extended wall 18 provided in an upper part of the mounting hole 3. When the temperature switch 4 has been inserted deep into the mounting hole 3, the distal ends of the claws 71 enter the groove 63. Accordingly, the present embodiment can achieve the same effect as the fifth embodiment. Moreover, since the claws are provided integrally on the cap 8, the number of components can be reduced.

Figure 19:
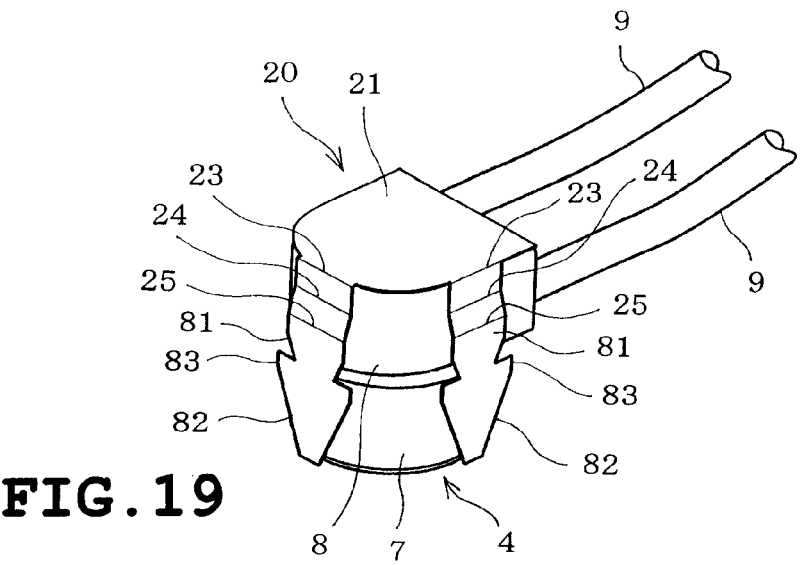
FIG. 19 is a view similar to FIG. 4, showing a seventh embodiment of the present invention.
Figure 20:
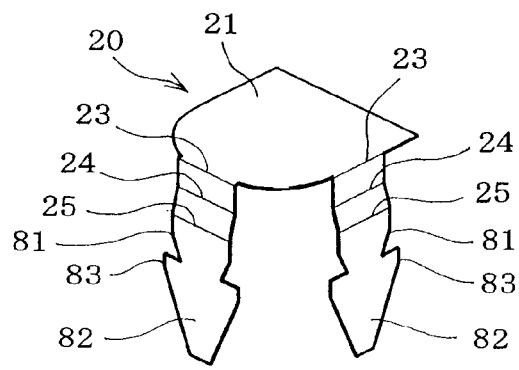
FIG. 20 is a view similar to FIG. 6.
Figure 21:
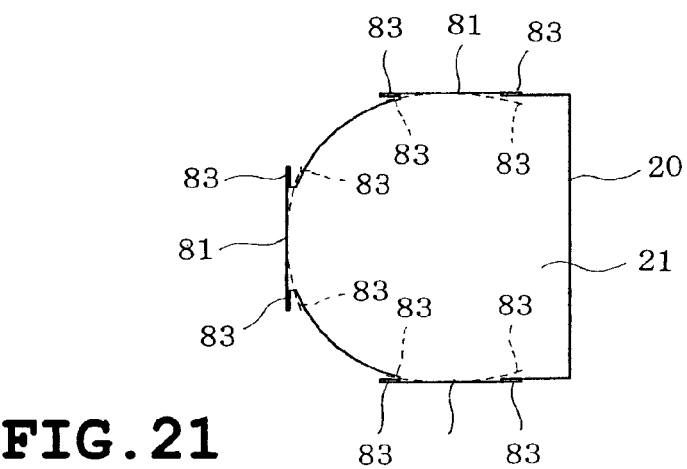
FIG. 21 is a top plan view of the fixing cover.

FIGS. 19 to 21 illustrate a seventh embodiment. Only the differences of the seventh embodiment from the fifth embodiment will be described. The fixing cover 20 in accordance with the seventh embodiment has three legs 81, instead of the legs 61. An upper half of each leg 81 has substantially the same structure as each shorter leg 22 as shown in the first embodiment and is bent at the first to third bending portions 23 to 25 provided at substantially the same location as each shorter leg 22. Furthermore, each leg 81 has a lower half formed into a triangular tongue 82, which has both upper side corners serving as claws 83.

In the present embodiment, the temperature switch 4 covered by the fixing cover 20 is pushed into the mounting hole 3 which has the same structure as in the fifth embodiment, whereby the temperature switch 4 is attached to the mounting hole. When the temperature switch 4 and fixing cover 20 are inserted into the mounting hole 3, the tongues 82 are flexed along the inner surfaces of the mounting hole 3 and extended wall 18 (as shown by broken line in FIG. 21). When the temperature switch 4 and fixing cover 20 have been inserted deep into the mounting hole 3 such that the claws 83 reach the groove 63, the claws 83 enter the groove 83, whereupon each tongue 82 returns to a former state. Accordingly, even when a force with a direction in which the temperature switch 4 and fixing cover 20 drop out of the mounting hole 3 is applied to the temperature switch 4 and fixing cover 18, the temperature switch 4 can be prevented from falling off the mounting hole 3 since the claws 83 are locked in the groove 63.

Figure 22:
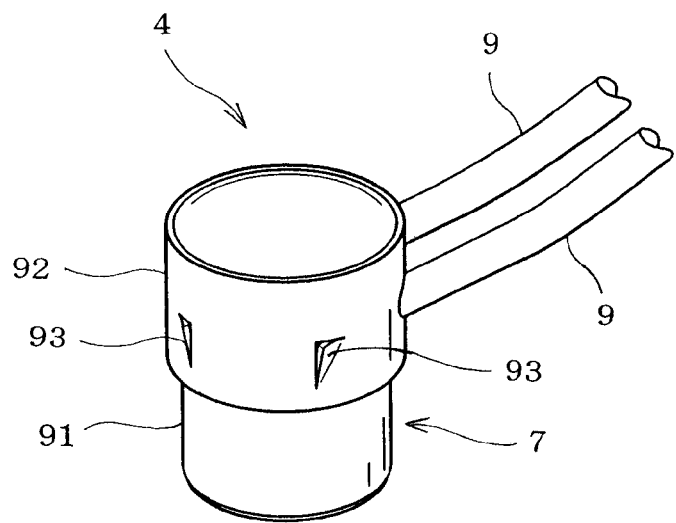
FIG. 22 is a view similar to FIG. 5, showing an eighth embodiment of the present invention.
Figure 23:
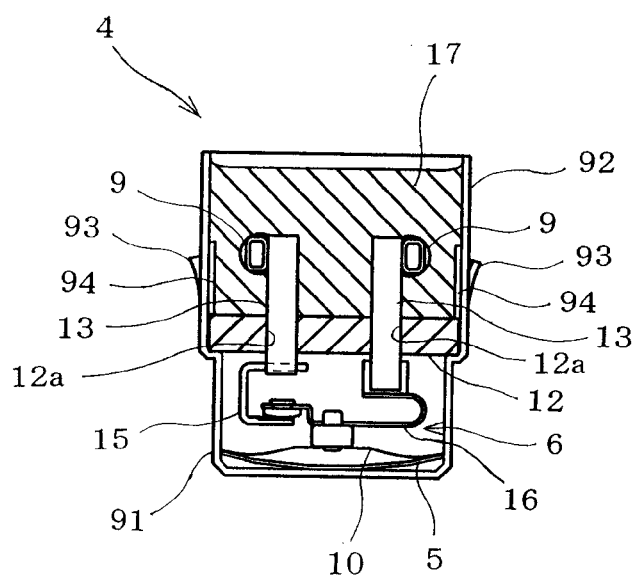
FIG. 23 is a view similar to FIG. 8.

FIGS. 22 and 23 illustrate an eighth embodiment. Only the differences of the eighth embodiment from the first embodiment will be described. The temperature switch 4 of the eighth embodiment is provided with no resin cover. The thermally actuated element 5, the contact mechanism 6 and the like are housed in the lower half of the switch body 7 comprised of a cylindrical container made of a metal harder than the housing. The lead wires 9 are drawn out of the upper circumferential side of the switch body 7.

More specifically, the switch body 7 comprises a lower half smaller diameter portion 91 and an upper half larger diameter portion 92. The thermally actuated element 5 and the like are housed in the smaller diameter portion 91. A metal plate 12 having two through holes 12a is mounted by welding or the like on a stepped portion between the smaller and larger diameter portions 91 and 92. The conductive pins 13 are inserted through the through holes 12a respectively. The larger diameter portion 92 of the switch body 7 has two holes (not shown) formed in a side thereof. The lead wires 9 connected to the conductive pins are inserted through the holes, respectively.

The larger diameter portion 92 of the switch body 7 is filled with a filler 17 having electrical insulating properties. The filler 17 hermetically seals gaps between the through holes 12a and the conductive pins 13 and connections between the conductive pins 13 and the lead wires 9.

Furthermore, three triangular claws 93 are provided on the circumferential side of the larger diameter portion 92 of the switch body 7. One of the claws 93 is provided at a location where the claw is opposed to the hole through which the lead wire 9 is drawn out. The other two claws 93 are provided at locations between the claw 93 opposed to the hole and the hole. The claws 93 are provided at respective locations where the claws are buried in the adhesive when the temperature switch 4 has been inserted into the mounting hole 3.

Each claw 93 is formed by raising a part of the side of the larger diameter portion 92. Accordingly, thin plates 94 are mounted on the inner surface of the larger diameter portion 92 corresponding to the respective claws 93 in order to prevent the filler 17 from leaking through the claws 93.

In the above-described construction, when the temperature switch 4 is inserted into the mounting hole 3, the claws 93 are pressed in such a direction that the claws escape from the inner surface of the mounting hole 3. The distal ends of the claws 93 are adapted to strongly abut against the inner surface of the mounting hole 3 by a returning force (an outwardly spreading force). Accordingly, the claws 93 having abutted against the inner surface of the mounting hole 3 are caused to bite into the inner surface of the mounting hole 3 thereby to be locked. Consequently, the temperature switch 4 can be prevented from falling off the mounting hole 3.

Furthermore, the number of components can further be reduced in the embodiment since a part of the switch body 7 of the temperature switch 4 constitutes each claw 93.

Figure 24:
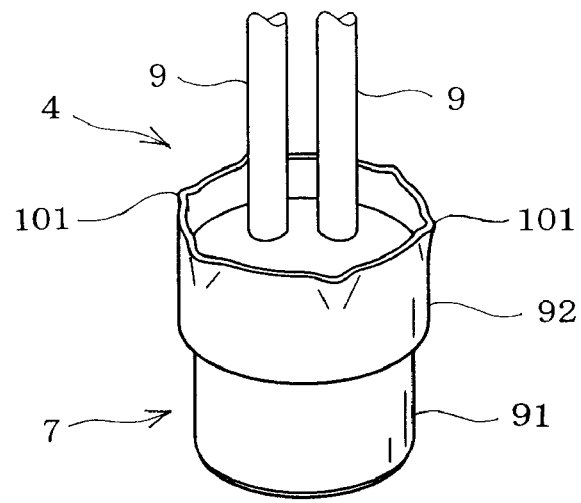
FIG. 24 is a view similar to FIG. 5, showing a ninth embodiment of the present invention.
Figure 25:
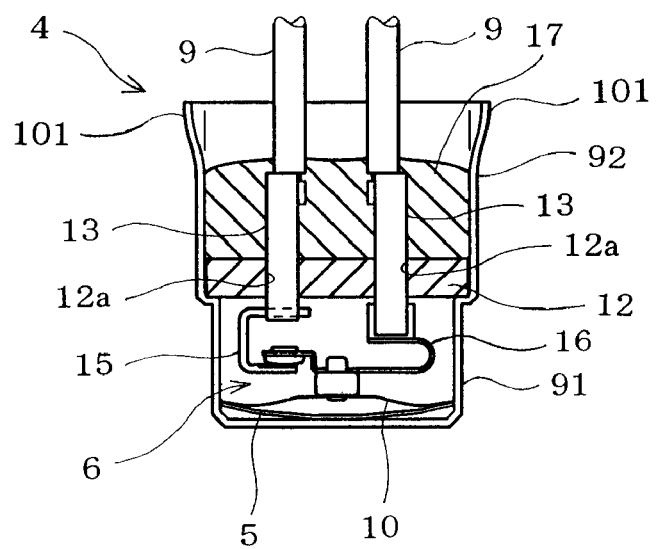
FIG. 25 is a view similar to FIG. 8.

FIGS. 24 and 25 illustrate a ninth embodiment. Only the differences of the ninth embodiment from the eighth embodiment will be described. In the temperature switch 4 of the ninth embodiment, the lead wires 9 connected to the respective conductive pins 13 are drawn out of upper openings of the switch body 7. Furthermore, a plurality of outwardly protruding convex portions 101 (serving as claws) are provided at equal intervals on the upper end of the switch body 7. The convex portions 101 are formed by drawing the switch body 7.

Furthermore, the larger diameter portion 92 is filled with the filler 19. The larger diameter portion 92 is filled with the filler 19 so that an upper surface thereof does not reach the convex portion 101.

In the above-described construction, when the temperature switch 4 is inserted into the mounting hole 3, the convex portions 101 abut against the inner surface of the mounting hole 3, whereupon the upper end of the larger diameter portion 92 is pressed inward. Consequently, the distal ends of the convex portions 101 bite into the inner surface of the mounting hole 3 by the returning force of the upper end of the larger diameter portion 9, thereby being locked. Consequently, the temperature switch 4 can be prevented from falling off the mounting hole 3.

The foregoing embodiments should not be restrictive and may be modified as follows.

The number of legs of the fixing cover should not be limited to 3 but may be 1 or 2. Furthermore, four or more legs may be provided.

The leg pieces (see FIG. 15) provided on the cap 8 as shown in the fourth embodiment may be provided with the respective claws similar to the claws 62 in the fifth embodiment, and a groove serving as an engagement portion may be provided in the corresponding inner surface of the housing recess. Furthermore, claws similar to the claws 62 as shown in the fifth embodiment may be provided integrally on the metal container.

As described above, the mounting structure of the temperature switch according to the present invention is useful as a mounting structure for a protector against an excessive temperature increase in compressors used in vehicle air conditioners.

The invention claimed is:

1. A structure for mounting a temperature switch on a compressor of a vehicle air-conditioner, the temperature switch having a bottomed cylindrical container made of a metal and a circular shallow dish-shaped thermally responsive element disposed on a bottom of the metal container, comprising:
    a housing recess provided on a surface of a housing of the compressor for housing the temperature switch;
    a fixing cover including an upper cover covering an upper surface of the temperature switch and one or a plurality of band-shaped legs downwardly extending from a peripheral edge of the upper cover along a side of the temperature switch, the fixing cover being housed in the housing recess together with the temperature switch while covering the temperature switch from above; and
    one or a plurality of claws provided on the band-shaped legs of the fixing cover,
    wherein when the temperature switch is housed in the housing recess, the claws are engaged with an inner surface of the housing recess to be locked, whereby the temperature switch is fixed in the housing recess;
    wherein an adhesive having thermal conductivity is housed in the housing recess, the adhesive being interposed between a lower part of the temperature switch and the housing recess when the temperature switch is housed in the housing recess; and
    wherein the band-shaped legs are constructed so that parts of the band-shaped legs are buried in the adhesive when the temperature switch is housed in the housing recess.

2. The temperature switch mounting structure according to claim 1, wherein the temperature switch includes a cap made of a resin and covering an upper part of the metal container, and the fixing cover is mounted to the cap by thermal caulking.

3. The temperature switch mounting structure according to claim 1, wherein the fixing cover is made by bending a metal harder than the housing of the compressor so that the upper cover, the band-shaped legs and the claws are formed integrally with the fixing cover, and the claws are comprised of pointed protrusions respectively.

4. The temperature switch mounting structure according to claim 3, wherein the claws are provided on two widthwise opposed portions of the band-shaped legs respectively.

5. The temperature switch mounting structure according to claim 3, wherein the temperature switch and the fixing cover have been housed in the housing recess, the band-shaped legs are constructed so that portions thereof on which the claws are provided are biased toward an inside of the housing recess.

* * * * *